Feb. 21, 1950   J. H. WATTSON   2,498,189
AUTOMATIC CONTROL AND DISTRIBUTION OF FLUIDS
Filed Dec. 12, 1946   2 Sheets-Sheet 2
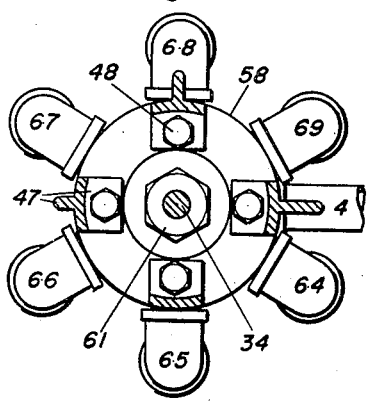
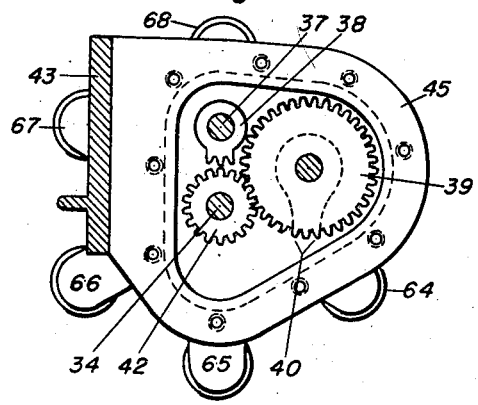
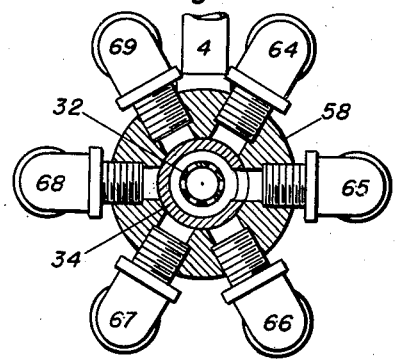
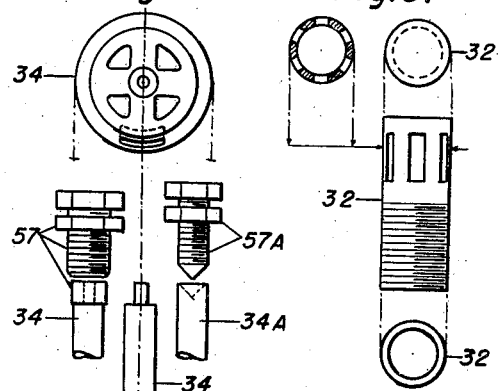
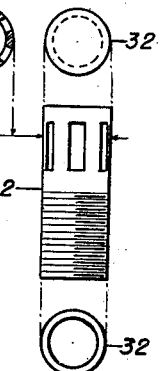
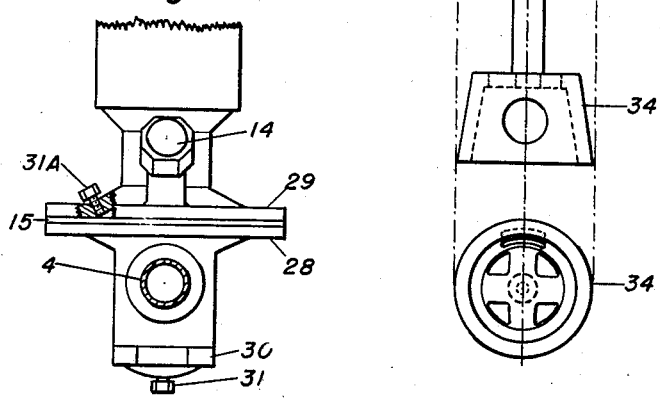
INVENTOR.
John H. Wattson
BY Thomas F. Healy
Attorney Patented Feb. 21, 1950

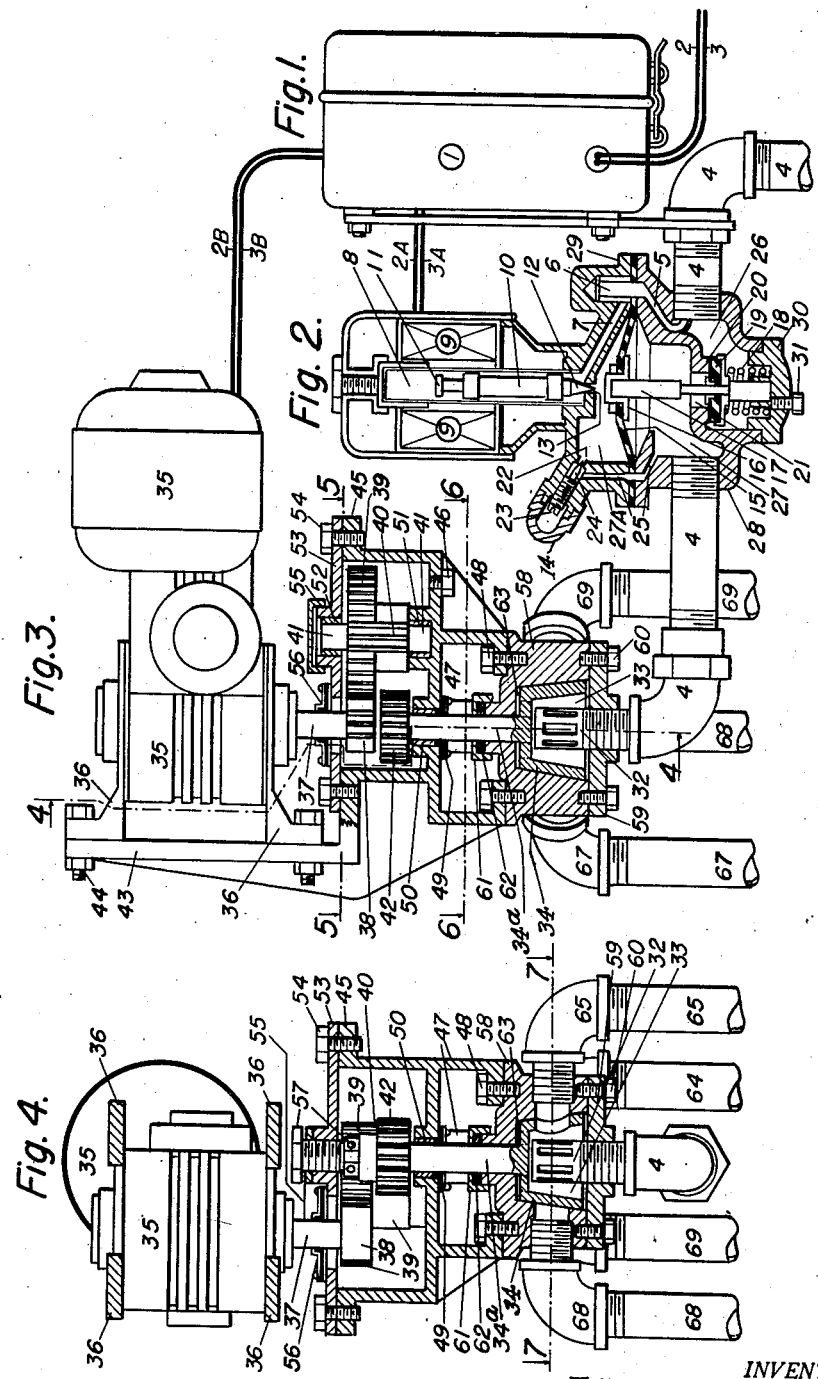

2,498,189

UNITED STATES PATENT OFFICE 2,498,189

AUTOMATIC CONTROL AND DISTRIBUTION OF FLUIDS

John H. Wattson, Salt Lake City, Utah

Application December 12, 1946, Serial No. 715,753

2 Claims. (Cl. 161—7)

The present invention relates to apparatus for the distribution of fluids, and more particularly to a sprinkling equipment for gardens, farms, lawn or orchards which includes automatic and time-controlled apparatus for periodically and selectively distributing fluid through one or more fluid outlets.

The primary object of the present invention is to provide a sprinkling apparatus which may be set to automatically operate for certain exact periods of time of any desired day or night.

Another object is to provide an apparatus for the distribution of fluids comprising, in combination, a fluid distribution mechanism operated by power means, a solenoid operated valve for controlling the flow of fluid to the fluid distribution mechanism, and an electrically operated automatic timer for simultaneously energizing said power means and operating said solenoid valve.

A further object is to provide a simple, efficient, effective and inexpensive apparatus for the distribution of fluids which is automatic in operation and yet has a minimum number of moving parts, all of which are readily accessible for repair or replacement when necessary.

Still another object is to provide an apparatus for the distribution of fluids, including a power operated gear motor governed by an electrical timer and selectively controlling the on-off cycle of a plurality of fluid outlets through a gear train powered by said motor, in combination with a solenoid operated valve for controlling the supply of fluid to the fluid outlets, with said solenoid valve being actuated by said timer.

Yet another object is to provide a solenoid operated valve having fluid drains constructed so that fluid can be drained off and out of contact with the valve structure during winter months.

Another object is to provide a valve structure with a Pitot tube to enable the valve to operate at a lower pressure differential.

Other and further objectives and advantages of this invention will be apparent from the following description thereof and from the claims appended thereto.

In the drawing wherein like numerals refer to like or corresponding parts throughout the several views;

Figures 1, 2 and 3 depict a composite view of the present invention, partly in section, and embodying the features of the invention, Figure 4 is a sectional view taken along the line 4—4 of Figure 3, in the direction of the arrows, Figure 5 is a sectional view taken along the line 5—5 of Figure 3, in the direction of the arrows, Figure 6 is a sectional view taken along the line 6—6 of Figure 3, in the direction of the arrows, Figure 7 is a sectional view taken along the line 7—7 of Figure 4, in the direction of the arrows, Figure 8 is a disassembled view of certain parts comprising the fluid distribution mechanism, Figure 9 is a detail of the fluid deflector element, and Figure 10 is a fragmentary detail of the valve structure, more particularly showing the valve draining feature.

Referring now to the drawing and more particularly to the composite view represented by Figures 1, 2 and 3, there is generally shown an assembly for the automatic and periodic distribution of water, or other fluid, for a lawn sprinkling system, or for any other purpose. The numeral 1 generally represents a timing switch, of any desired make or capacity, as for example, a General Electric switch, Type T—27, Model 3T27—AAA3. The function of the timing switch 1 is to electrically energize, at any selected predetermined time, the solenoid valve, as shown in Figure 2 of the drawing, and as explained more fully hereinafter. Also, the timing switch 1 controls a gear motor which operates the fluid distribution mechanism as fully set forth in Figure 3 of the drawing.

The timing switch 1 is supplied with electric current by means of conductors 2 and 3. The timing switch 1 can be set to fulfill any of a number of time conditions, for example, to operate the fluid distribution mechanism at any predetermined time within the twenty-four hours of a day; secondly, to operate the fluid distribution mechanism only once, or a multiple number of times in any one day, or to operate the said mechanism for any desired length of time, and also to operate the fluid distribution mechanism only on any desired day or days of the week. After the timing switch 1 has been set to fulfill the desired conditions, the operation of the sprinkling system will then be entirely automatic and will be repeated daily or weekly until such time as the setting of the switch shall have been changed.

Referring more particularly to Figure 2 of the drawing, there is shown a solenoid operated valve. The function of the solenoid valve is to open at a predetermined time and allow water, or other fluid, to pass through the supply pipe line 4, to the fluid distribution mechanism, as shown in Figure 3, and as more fully explained hereinafter, and at the termination of a desired interval of time to close and stop the flow of water through pipe line 4. The pipe 4 may be made of any desired material and of any suitable diameter. I have found it convenient to employ a pipe having a ¾" diameter, particularly when operating with approximately six banks of sprinkler heads.

The solenoid valve is operated in the following manner. When the circuit is closed by the timing switch 1, electric current passes through conductors 2A and 3A, thus energizing the coils 9 of the valve, and establishing a magnetic field. The magnet attracts and forcefully elevates the tubular hammer 10. Hammer 10, on rising, strikes the cap 11 on the upper end of the needle valve shaft. The needle valve shaft and the needle point 12 attached thereto are elevated, leaving the aperture 13 open.

Water standing in the upstream portion of the pipe line 4 passes through the Pitot tube 5, the lower end of which has been curved upstream to oppose the water flowing through the feed pipe 4, through the filter 6, up through the tube 7, and into the chamber 8. When the needle valve is open, water passes through the aperture 13 into the space 27A above the diaphragm 15. A force is thus exerted on the diaphragm 15 equal to the area of the diaphragm in square inches multiplied by the water pressure in pounds per square inch. This force being greater than the thrust of the spring 18, the diaphragm 15 is forced downwardly, and by means of the cap 16 and the vertical shaft 17, force downwardly the valve disc 19 to compress the said spring 18. The valve disc 19 having been forced downwardly and away from the valve seat 20, the valve is thus opened and water passes through the aperture 21 into the space 27, and thence through the pipe line 4 to the water distribution mechanism, as shown in Figure 3 of the drawing. By curving the lower end of tube 5 upstream to oppose the water flowing through feed pipe 4 a Pitot tube is formed. This Pitot tube will materially increase the fluid pressure in chamber 27A and thence to the top side of the diaphragm 15. This will enable the valve to operate at a lower pressure differential between the upstream and the downstream sides of the valve orifice 21.

At the expiration of the time for which the timing switch 1 has been set, the circuit is opened, and no current flows through the conductors 2A and 3A to the coils 9. The magnetic force thus terminates, and the hammer 10 and the needle valve shaft drop by gravity into their original position. The needle point 12 closes the aperture 13, and water no longer flows through the system.

By removing the cap 14, and applying a screw driver in the slot 23, the position of the needle 24 has been so set as to permit a small amount of water to pass from the chamber 27A, through the aperture 22, around the needle valve stem and downwardly through the tubes 25 into the chamber 27.

When the coils 9 have been de-energized, and when the aperture 13 has been closed by the needle point 12, the thrust of the spring 18 forces the valve disc 19, the shaft 17, the cap 16, and the diaphragm 15 upwardly. Water in the chamber 27A is forced through the orifice 22 of the secondary needle valve. The valve disc 19 is forced against the valve seat 20, and the solenoid valve is thus closed and the flow of water through the supply pipe line 4 is terminated.

The spring 18 is removably held in position by the cap 30, threadedly attached to a housing 28. Threaded into cap 30 is a drain plug 31. Above the diaphragm 15 and threaded into the upper housing is a second drain plug 31A, Figure 10. These drains are particularly for the purpose of draining fluid to prevent ice forming and bursting the housing when the housing is standing idle during the winter months.

Referring now more particularly to Figure 3, there is shown the fluid distribution mechanism which is designed, at the expiration of equal periods of time, automatically to change the flow of water from one to another of a series of pipe lines and automatically to repeat the cycle as many times as might be desirable under the circumstances. The fluid distribution mechanism comprises a gear motor 35 attached to a suitable base 43 by means of bolts 44, or the like. The motor base 43 may be cast integrally with either the gear case 45 or the gear case cover 53. The gear case cover 53 is attached to the gear case 45 by means of cap screws 54. Cast integrally with the gear case 45 are gear case legs 47 which are in turn secured to the distributor valve body 58 by the cap screws 48. Secured to the bottom of the valve body 58 is the flange 59, attached by means of the cap screws 60. A deflector 32 is threadedly engaged into and through the flange 59, and to the protruding lower end of deflector 32 is secured the terminus of pipe line 4.

The distributor valve body 58 comprises a circular manifold with equally spaced apart lateral axial ports, the outer ends of which are tapped, and into which are screwed the respective discharge pipes 64, 65, 66, 67, 68 and 69, as best shown in Figure 7 of the drawing.

The lower bell shaped end of the distributor 34 is rotatably fitted into the cavity on the inside of the valve body 58. Extending through the wall of the distributor bell is a lateral port. The distributor bell is periodically rotated by means of the gear motor 35 acting through a suitable gear train, as hereinafter more fully explained. The distributor bell rotates through equal arcs of a circle so that at each stop the port in the bell of the distributor is centered oppositely to a lateral axial port in the valve body 58.

In the operation of the fluid distribution mechanism, the gear motor is energized by means of the conductors 2B and 3B, when the circuit is closed by the operation of the timing switch 1. The gear motor 35 is energized and de-energized simultaneously with the solenoid valve through the operation of the timing switch 1. When the gear motor 35 is energized, the gear motor shaft 37 and the attached pinion 38 are rotated. The pinion 38, in a preferred form of the invention, does not contain a full complement of teeth or cogs. The teeth on the pinion 38 subtend a certain angle, the magnitude of which is dependent on the number of outlets in the distributor valve body 58. In the drawing, the valve body 58 has six outlet ports, and therefore the angle subtended by the existing teeth in the pinion 38 would be 60°. The pinion 38, if it contained a complete complement of teeth, would have 18, but actually has three teeth, or eighteen divided by six, the number of outlet ports in the valve body 58.

Once every revolution of the pinion or gear 38, three teeth engage corresponding teeth in an idler gear 39. The idler gear 39 is thereby caused to rotate through an appropriate angle subtended by the number of teeth existing on pinion 38. The idler gear 39 has thirty-six teeth, and since gear 38 has only three teeth, gear 39 would be rotated through a one-twelfth of a revolution or 30°. This result is derived by dividing the number of teeth on the gear 38 by the number of teeth on the idler gear 39.

Once every revolution made by the idler gear 39, the elongated teeth 40 thereof engage teeth in the distributor gear 42. The distributor gear 42 is thereby caused to rotate through an angle subtended by the number of elongated teeth 40 disposed on the gear 39. The elongated teeth 40 are three in number, and the distributor gear 42 contains eighteen teeth. Therefore, the distributor gear 42 will rotate through 60°, and will then remain at rest until gear 39 has made another revolution. Gears 38 and 39 are set at the same level, while the gear 42 is set at a somewhat lower level, and is only rotated when engaged by the elongated teeth 40 of the gear 39. Gear 39 is securely attached to the gear shaft 41 which revolves in bearings 51 and 52. The lower bearing 51 is suitably located in the gear case 45, while the upper bearing 52 is disposed in the gear case cover 53. Any suitable type of bearings may be employed.

The upper end of the shaft 34a, to which the distributor gear 42 is secured, rotates in the bearing 50 which is suitably disposed in the gear case 45.

Only one, as shown in drawing, or a multiple number of idler gears may be used depending on results desired. When a multiple number of idler gears is used each is equipped with elongated teeth and each is set at a lower level than its predecessor so that it can be rotated only by the elongated teeth of its predecessor. The right is reserved to the use of any number of gears in the gear train, also to the use of any component number of teeth on each gear and to any number of elongated teeth on the idler gears.

The water which passes through the pipe line 4 when the system is open and in operation, passes into the deflector 32. The stream of water strikes the under concave surface of the deflector top, which absorbs the momentum of the stream, and thus the deflector 32 lessens the upward thrust of the shaft 34a. The water then passes from the interior of the deflector 32 outwardly through the several lateral ports or slots disposed therein, and into the annual space 33 which surrounds the deflector element 32 and thence through the lateral port through the wall of the distributor bell 34, and through one of the axial ports of the distribution body 58, and then into and through one of the discharge pipe lines 64, 65, 66, 67, 68 or 69. The water flow passes into and through each of the respective discharge ports 64 through 69, for equal successive periods of time. The particular discharge port which is being operated will depend upon the momentary position of the aperture in the distributor bell 34.

All the gears and gear shafts are lubricated by filling the interior of the gear case 45 with oil or grease. The upper end of the gear shaft 41 is suitably lubricated by means of a grease or oil cup 55 located on the gear case cover 53. An oil or grease drain 46 is disposed in the bottom of the gear chamber formed by the gear case 45. A suitable oil or grease seal 49 is situated beneath the gear case 45, and beneath the bearing 50, and is disposed around the shaft 34a. A suitable dust seal 56 is disposed on the top of the gear case cover 53, and surrounds the gear motor shaft 37.

The distributor bell 34 has openings in the top thereof, at the lower end of the shaft 34a, to permit flow of water into the space 63, to thus reduce the effective hydraulic pressure against the bell shaped distributor 34 and the resulting upward thrust of the shaft 34a. Water is prevented from leaking out around the distributor shaft 34a by means of gland 61 and the packing 62. Thrust bearing 57 may be employed to cushion against excessive upward thrust of the shaft 34a due to hydraulic pressure of water flowing through the distributor 34.

When operating the fluid distribution system, the timer 1 is set to operate at any predetermined time. In operation, the timer 1 energizes the coils 9 of the solenoid valve, which in turn permits the free flow of water through the supply line 4 into the water distribution mechanism. The water flows through the deflector 32 and outwardly through a port disposed in the bell 34 and thence through a suitable discharge pipe depending upon the disposition of the aperture in the bell 34. With the energization of the solenoid valve by the timer 1 to permit the free flow of water through pipe line 4, the gear motor 35 is likewise energized to cause a rotation of the shaft 37 which in turn rotates the pinion 38, the idler gear 39, and the distributor gear 42 to which is attached the shaft 34a which has bell 34 secured thereto. In rotating the bell 34 by means of rotating the gear 42, the outlet aperture disposed in said bell 34 is periodically and successively placed in registry with the circularly disposed water discharge pipes 64, 65, 66, 67, 68 and 69. Any desirable and suitable spray or sprinkler heads may be attached to the outlet ends of the said discharge pipes 64 through 69.

At the expiration of a predetermined time, the timer switch 1 will break the operating circuit, causing the de-energization of the magnetic coils 9 which in turn causes the closing of the solenoid valve to thus stop the flow of water through the supply pipe to the outlets 64 through 69. Simultaneously with the closing of the solenoid valve, the gear motor 35 ceases to operate and thus the gear 42 no longer rotates, thus stopping the rotation of the bell 34.

The timer 1, the solenoid valve 2, and the distributor 3 may be grouped into a compact unit, as shown in the drawing, or may be located in remote positions from each other.

Various modifications of the present invention will be apparent to those skilled in the art without departing from the scope thereof. It is therefore desired that the invention be limited only to the scope of the appended claims.

What I claim is:

1. In a fluid distribution system including an automatic electrically operated timer and means for periodically supplying fluid to the system including a solenoid operated valve controlled by the timer; a fluid distribution apparatus having a plurality of circularly spaced fluid outlets and comprising, a motor controlled by the electrically operated automatic timer independently of the control of the solenoid operated valve by the timer, a shaft rotatably driven by said motor, a pinion secured to said rotatable shaft and having an incomplete complement of circularly spaced teeth, the number thereof being dependent upon the number of fluid outlets, a secondary gear disposed in the same horizontal plane as said pinion and being provided with vertically elongated teeth, said secondary gear being operated through said pinion, a distribution gear disposed below said secondary gear and rotated by the elongated teeth of said secondary gear to selectively control the on-off cycle of fluid flow through said fluid outlets.

2. In a fluid distribution system including an automatic electrically operated timer and means for periodically supplying fluid to the system including a solenoid operated valve controlled by the timer; a fluid distribution apparatus having a plurality of circularly spaced fluid outlets and comprising, a gear motor controlled by the electrically operated automatic timer independently of the solenoid operated valve and the fluid controlled thereby, a shaft rotatably driven by said motor, a pinion secured to said rotatable shaft and having an incomplete complement of circularly spaced teeth, the number thereof being dependent upon the number of fluid outlets, a secondary gear disposed in the same horizontal plane as said pinion and having circular teeth, some of which are vertically elongated, said secondary gear being operated through said pinion, a distribution gear disposed below said secondary gear and rotated by the elongated teeth thereof, a shaft secured to and rotated by said distribution gear, a distributor bell secured to said shaft and said bell having a fluid outlet port which is periodically in registry with one of said fluid outlets.

JOHN H. WATTSON.

REFERENCES CITED

The following references are of record in the file of this patent:

UNITED STATES PATENTS

| Number | Name | Date |
|---|---|---|
| 675,946 | Gulland | June 11, 1901 |
| 1,005,117 | Judell | Oct. 3, 1911 |
| 1,739,787 | Doughty et al. | Dec. 17, 1929 |
| 1,825,443 | Chormann et al. | Sept. 29, 1931 |
| 2,102,076 | Johnson | Dec. 14, 1937 |
| 2,335,923 | Dube | Dec. 7, 1943 |
| 2,417,994 | Sheets | Mar. 25, 1947 |